United States Patent [19]
Iizuka

[11] Patent Number: 5,847,758
[45] Date of Patent: Dec. 8, 1998

[54] COLOR CCD SOLID-STATE IMAGE PICKUP DEVICE

[75] Inventor: Tetsuya Iizuka, Kanagawa, Japan

[73] Assignee: Sony Corporation, Tokyo, Japan

[21] Appl. No.: 694,941

[22] Filed: Aug. 9, 1996

[30] Foreign Application Priority Data

Aug. 11, 1995 [JP] Japan ..................................... 7-227230

[51] Int. Cl.$^6$ ..................................................... H04N 3/14
[52] U.S. Cl. ........................... 348/317; 348/321; 348/315; 348/280; 348/283
[58] Field of Search ..................................... 348/272, 273, 348/276, 280, 282, 283, 305, 324, 317, 315, 321

[56] References Cited

U.S. PATENT DOCUMENTS

| | | | |
|---|---|---|---|
| 4,479,143 | 10/1984 | Watanabe et al. ........................ | 358/44 |
| 4,500,915 | 2/1985 | Koike et al. ............................... | 358/44 |
| 4,553,159 | 11/1985 | Moraillon ................................... | 358/44 |
| 4,821,088 | 4/1989 | Tabei et al. ................................ | 358/48 |
| 5,737,017 | 4/1998 | Udagawa et al. ........................ | 348/280 |

OTHER PUBLICATIONS

ITE '94 "½–Inch 900k–pixel IT–CCD Image Sensor", 1994 ITE Annual Convention, pp. 475–476.

*Primary Examiner*—Andrew I. Faile
*Assistant Examiner*—Jacqueline Wilson
*Attorney, Agent, or Firm*—Hill & Simpson

[57] ABSTRACT

A color CCD solid-state image pickup device having a color filter array such that it is not possible to mix pixels adjacent in the column direction. Even rows and odd rows of pixels arrayed in a matrix respectively have the same filter arrays and it is thereby made possible for signal charges of light-receiving parts in pixels of a Kth row (K being a positive integer) and signal charges of light-receiving parts in pixels of either of the K±th rows to be mixed and vertically transferred in the vertical shift registers.

9 Claims, 7 Drawing Sheets

FIG. 3

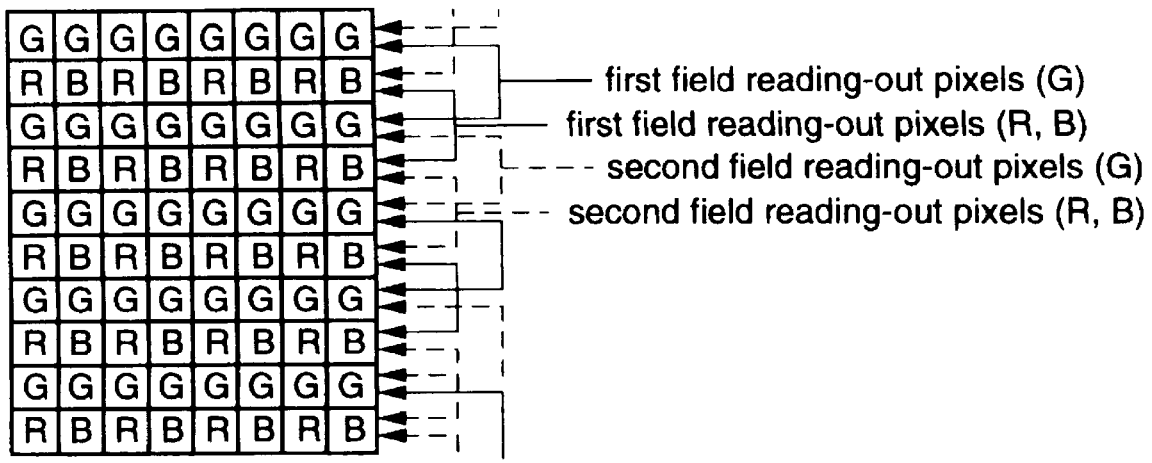

— first field reading-out pixels (G)
— first field reading-out pixels (R, B)
--- second field reading-out pixels (G)
--- second field reading-out pixels (R, B)

FIG. 4A first field of output 1

| K      line | (K+4) line |
| (K+2) line | (K+6) line | first field of output 2

| (K+1) line | (K+5) line |
| (K+3) line | (K+7) line | second field of output 1

| (K+2) line | (K+6) line |
| (K+4) line | (K+8) line | second field of output 2

| (K+3) line | (K+7) line |
| (K+5) line | (K+9) line |

FIG. 4B first field

| K      line | (K+1) line | (K+4) line | (K+5) line |
| (K+2) line | (K+3) line | (K+6) line | (K+7) line | second field

| (K+2) line | (K+3) line | (K+6) line | (K+7) line |
| (K+4) line | (K+5) line | (K+8) line | (K+9) line |

FIG. 9A

| G | R | G | R | G | R | G | R |
|---|---|---|---|---|---|---|---|
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |

FIG. 9B

| G | R | G | B | G | R | G | B |
|---|---|---|---|---|---|---|---|
| G | B | G | R | G | B | G | R |
| G | R | G | B | G | R | G | B |
| G | B | G | R | G | B | G | R |
| G | R | G | B | G | R | G | B |
| G | B | G | R | G | B | G | R |

FIG. 9C

| Ye | Cy | Ye | Cy | Ye | Cy | Ye | Cy |
|----|----|----|----|----|----|----|----|
| G  | Mg | G  | Mg | G  | Mg | G  | Mg |
| Ye | Cy | Ye | Cy | Ye | Cy | Ye | Cy |
| G  | Mg | G  | Mg | G  | Mg | G  | Mg |
| Ye | Cy | Ye | Cy | Ye | Cy | Ye | Cy |
| G  | Mg | G  | Mg | G  | Mg | G  | Mg |

FIG. 10
(PRIOR ART)

|      |   |   |   |   |   |   |   |   |                                  |
|------|---|---|---|---|---|---|---|---|----------------------------------|
|      | G | G | G | G | G | G | G | G | ← first field reading-out pixels |
|      | R | B | R | B | R | B | R | B | ← first field reading-out pixels |
|      | G | G | G | G | G | G | G | G | ←----- second field reading-out pixels |
|      | B | R | B | R | B | R | B | R | ←---- second field reading-out pixels |
| 4K   | G | G | G | G | G | G | G | G | ← first field reading-out pixels |
| 4K+1 | R | B | R | B | R | B | R | B | ← first field reading-out pixels |
| 4K+2 | G | G | G | G | G | G | G | G | ←----- second field reading-out pixels |
| 4K+3 | B | R | B | R | B | R | B | R | ←---- second field reading-out pixels |
|      | G | G | G | G | G | G | G | G | ← |
|      | R | B | R | B | R | B | R | B | ← |

COLOR CCD SOLID-STATE IMAGE PICKUP DEVICE

BACKGROUND OF THE INVENTION

This invention relates to a color CCD solid-state image pickup device comprising pixels arrayed in a matrix, vertical shift registers provided in correspondence with vertical columns of pixels for transferring signal charges from the pixels in the vertical direction and a color filter array of a kind such that it is not possible to mix pixels adjacent in the column direction.

The realization of high-resolution in solid-state image pickup devices is made possible by increasing pixel numbers, and to this end efforts have been made to increase pixel numbers; however, pixel number increases made hitherto have been increases in horizontal direction pixel numbers, and efforts have not been made to raise vertical direction pixel numbers. The reason for this is that vertical direction pixel numbers have been prescribed by television broadcast systems and it has been considered that there is no benefit in increasing pixel numbers against this prescription. By the same token, it is possible to raise horizontal direction resolution by increasing horizontal direction pixel numbers irrespective of television systems. Thus, it has been considered that for reasons related to television systems there is no meaning in increasing vertical direction pixel numbers it has not been possible to raise vertical direction resolution. As a result the problem has arisen that vertical resolution has become relatively low compared to horizontal resolution, and this unbalance is marked.

As one measure for resolving this unbalance it has been proposed that vertical resolution be doubled. One such proposal has been made in "A ½-inch, 900,000-Pixel IT-CCD Image Pickup Device", ITE '94: 1994 ITE Annual Convention pp 475–476.

In this color CCD solid-state image pickup device the vertical number of pixels is 1000, about twice what it has been hitherto, and the horizontal number of pixels is made 850 to make a ½-inch, 900,000-pixel device of vertical resolution 450 TV lines and horizontal resolution 530 TV lines wherein 8-phase CCD registers are used for the vertical transfer parts. The color filter array of this device is as shown in FIG. 10.

However, in the color CCD solid-state image pickup device described above wherein the vertical number of pixels is approximately twice what it has been in the past, as shown in FIG. 10, green G color filters are disposed in a certain pixel row (for example the 2Kth row), red R/blue B color filters are disposed in the row adjacent thereto on one side thereof (for example the 2K+1th row) and blue B/red R color filters are disposed in the row adjacent thereto on the other side (for example the 2K–1th row). Therefore, the array of the color filters, when seen in the column direction, has a green G/red R/green G/Blue B cycle of four pixels.

To interlace this color CCD solid-state image pickup device and make it compatible with a television system, as shown in FIG. 10, an operation, wherein in a certain field (for example a first field) signals of the pixels of the green G filters of the 4Kth row and the red R/blue B pixels of the 4K+1th row are read out and in the next field (a second field) signals of pixels of the green G filters of the 4K+2th row and signals of the pixels of the blue B/red R color filters of the 4K+3th row are read out, is carried out. A signal corresponding to one scanning line of a television signal is then synthesized from signals of the green G/red R/blue B of the 2Kth row and the 2K+1th row.

Therefore, if the pixels of the green G color filters and the red R/blue B color filters are looked at separately, this is equivalent to carrying out so-called frame read-out of pixels of green G filters (or pixels of red R/blue B filters) of 500 rows.

However, it has been well known that in frame read-out there is the problem that when the accumulation time of the pixels is made one frame period after imaging occurs and when it is made one field period the sensitivity is halved, and there is this kind of problem in the kind of related art color CCD solid-state image pickup device shown in FIG. 10 also.

In ordinary color CCD solid-state image pickup devices, this problem associated with frame read-out can be avoided by employing a field read-out method, and in practice that is what has been done.

However, in the color CCD solid-state image pickup device shown in FIG. 10, because it is not possible to employ a field read-out method, it is not possible to avoid the problems associated with the frame method. The reason for this is that because in the read-out, adjacent pixels (for example those of the Kth row and those of the K+1th row) are mixed, the problem arises that mixing of green G and red R signals and mixing of green G and blue B signals occurs.

SUMMARY OF THE INVENTION

Accordingly, the present inventors undertook to carry out amelioration of frame afterimaging or improvement of sensitivity also in a color CCD solid-state image pickup device having a color filter array of a kind with which it is not possible to mix pixels adjacent to each other in the column direction, i.e. in a color CCD solid-state image pickup device with which it is not possible to employ a related art ordinary field read-out method, and arrived at making the present invention as a result of carrying out extensive research toward the realization of this.

An object of the invention is to carry out amelioration of frame afterimaging or improvement of sensitivity in a color CCD solid-state image pickup device having a color filter array with which it is not possible to mix pixels adjacent to each other in the column direction. A color CCD solid-state image pickup device according to one embodiment of this invention is a color CCD solid-state image pickup device wherein even rows and odd rows of pixels arrayed in a matrix respectively have the same color filter arrays and is characterized in that signal charges of light-receiving parts in pixels in a Kth row (K being a positive integer) and signal charges of light-receiving parts of pixels in either of the K±2th rows are mixed and vertically transferred in vertical shift registers.

With such a color CCD solid-state image pickup device according to the invention, because even rows and odd rows of pixels respectively are the same, color mixing does not occur when they are mixed and field read-out by mixing and transferring signal charges of pixels of the Kth row and the K+2th row or mixing and transferring signal charges of pixels of the Kth row and the K–2th row becomes possible. As a result, because it is possible to handle interlacing with the color CCD solid-state image pickup device itself, it is possible to avoid the problem associated with frame read-out methods that when the signal accumulation time is made one frame period frame afterimaging occurs and when it is made one field period sensitivity is halved.

Of course, when it is not necessary to conform to a television system, by read out pixels without performing the above-mentioned mixing it is possible to reproduce images having superior resolution in the vertical direction.

In an embodiment of the invention, a color CCD solid-state image pickup device comprises pixels arrayed in a matrix, vertical shift registers provided in correspondence with vertical columns of pixels for transferring signal charges from said pixels in the vertical direction and a color filter array of a kind such that it is not possible to mix pixels adjacent in the column direction, wherein even rows and odd rows of said pixels arrayed in a matrix respectively have the same color filter arrays; and signal charges of light-receiving parts in pixels of a Kth row (K being a positive integer) and signal charges of light-receiving parts in pixels of either of the K±2th rows are mixed and vertically transferred in said vertical shift registers.

In an embodiment of the invention, a color CCD solid-state image pickup device comprises pixels arrayed in a matrix, vertical shift registers provided in correspondence with vertical columns of pixels for transferring signal charges from said pixels in the vertical direction and a color filter array of a kind such that it is not possible to mix pixels adjacent in the column direction, wherein even rows and odd rows of said pixels arrayed in a matrix respectively have the same color filter arrays; signal charges of an even row and signal charges of an even row two rows thereabove or therebelow are mixed in the vertical registers and these two rows are thereby compressed into one; and signal charges of an odd row and signal charges of an odd row two rows thereabove or therebelow are mixed in the vertical registers and these two rows are thereby compressed into one.

In an embodiment of the invention, the signal charges of the even rows and signal charges of the odd rows are outputted independently.

These and other features of the invention are discussed in greater detail below in the following detailed description of the presently preferred embodiments with reference to the accompanying drawings.

BRIEF DESCRIPTION OF THE DRAWINGS

FIG. 3 is a plan view illustrating field read-out in the preferred embodiment of FIG. 1.

FIGS. 4 (A) and (B) illustrate outputting of signals when field read-out is carried out, (A) showing a case wherein the number of outputs is two and (B) showing a case wherein the number of outputs is one.

FIGS. 9 (A) through (C) illustrate other examples of color filter dispositions with which it is possible to practice the invention.

FIG. 10 illustrates related art examples of a color filter disposition and interlacing.

DETAILED DESCRIPTION OF THE PRESENTLY PREFERRED EMBODIMENTS

The invention will now be described in detail with reference to preferred embodiments shown in the accompanying drawings.

Figure 1:
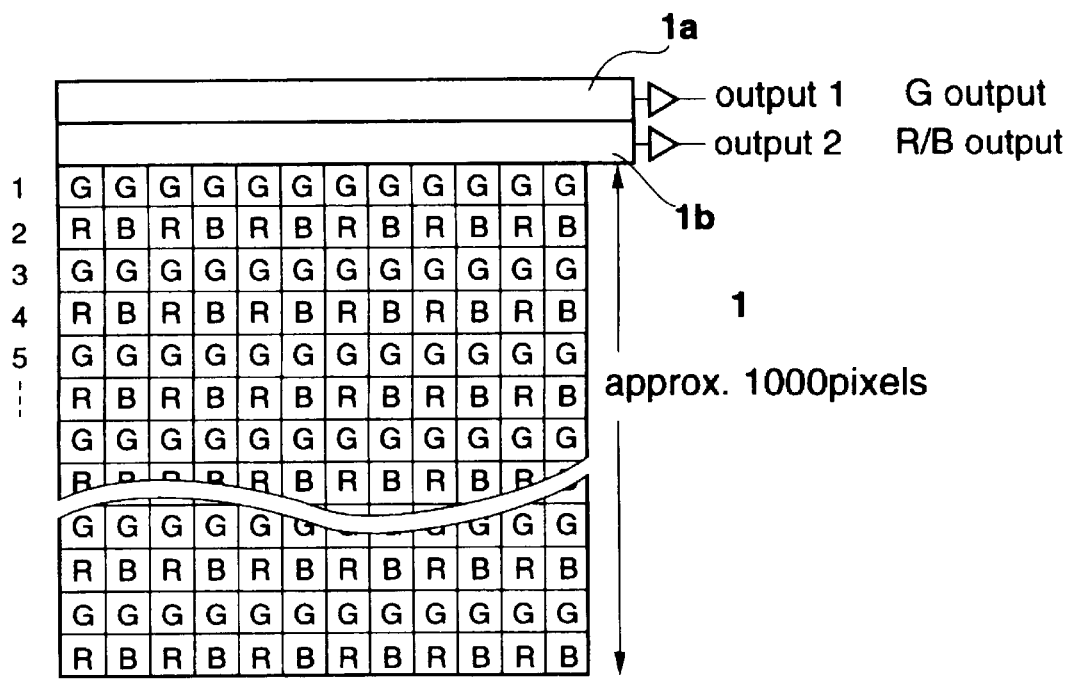
FIG. 1 is a plan view showing a disposition of color filters of a preferred embodiment of the invention.
Figure 2:
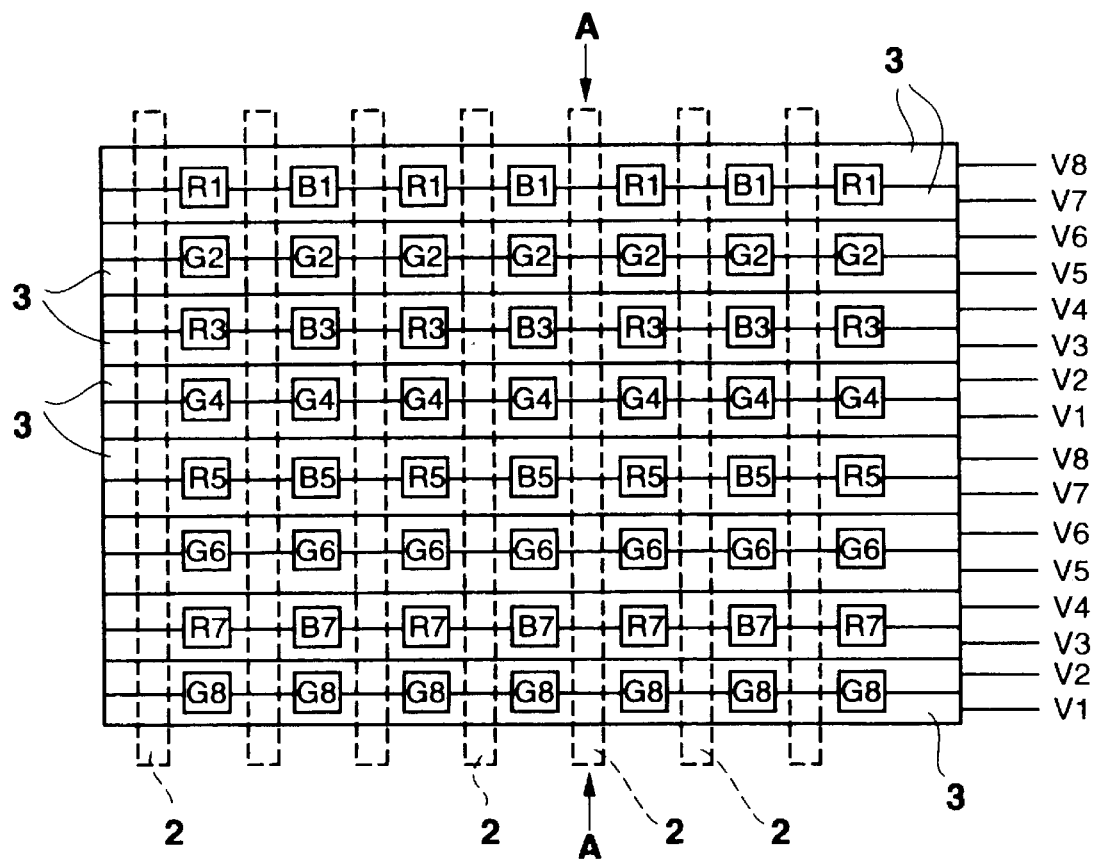
FIG. 2 is a plan view showing pixels, vertical registers and gate electrodes of the preferred embodiment of FIG. 1.

FIG. 1 through FIG. 5 illustrate a preferred embodiment of the invention. FIG. 1 is a plan view showing an arrangement of color filters; FIG. 2 is a plan view showing a construction of pixels, vertical registers and gate electrodes; FIG. 3 is a plan view illustrating field read-out; FIG. 4 (A) and (B) are views illustrating outputs of signals in different field read-out cases, (A) showing the case of this preferred embodiment (a case wherein the number of outputs, i.e. the number of horizontal registers is two) and (B) showing a case wherein the number of outputs (the number of horizontal registers) is one; and FIG. 5 (A) through (C) are operation-illustrating views, (A) being a gate construction view, (B) being a view showing changes in potential of a vertical transfer register and charge transfers and (C) being a waveform chart of gate electrode pulses driving the vertical registers.

In this color CCD solid-state image pickup device, as shown in FIG. 1, the color filters of all the pixels constituting the odd rows are green G, the red R and blue B color filters of the pixels constituting the even rows are disposed alternately in a two-pixel cycle and the color dispositions of the even rows are exactly the same (that is, it does not happen that a certain even row is RBRB... and the next even row is BRBR..., but rather all the even rows are the same, for example RBRB...). As a result, the color filters of this color CCD solid-state image pickup device are in a horizontal two-pixel cycle, vertical two-pixel cycle array.

The number of pixels in the vertical direction is 1000, approximately twice that of an ordinary color CCD solid-state image pickup device, and the number of pixels in the horizontal direction is, for example, 850 (but may be greater than this or less than this; the only difference it makes is that the greater the number of pixels in the horizontal direction is, the higher the horizontal resolution is). A first horizontal register I a outputs an odd row signal (G) and a second horizontal register 1b outputs an even row signal (R/B).

FIG. 2 is a plan view showing shift registers and their gate electrodes, wherein R1, R3..., G2, G4..., B1, B2... indicate pixels, R, G and B are colors of color filters and the numbers appended thereto are numbers given to the rows shown in FIG. 2.

Vertical registers 2, 2,... for performing vertical transfer are provided in correspondence with vertical columns of pixels and read out signals from the pixels of the vertical columns and transfer signal charges read out from the pixels in the vertical direction (in this preferred embodiment, upward in FIG. 1 and FIG. 2).

Gate electrodes 3 for driving the vertical registers 2, 2,... are disposed in the horizontal direction avoiding light-receiving elements of the pixels. Vertical transfer by the vertical registers 2, 2,... is effected by 8-phase driving pulses V1 to V8.

This color CCD solid-state image pickup device is so constructed that when interlacing is to be carried out a new field read-out method shown in FIG. 3 can be employed. The related art methods of interlacing of a color CCD solid-state image pickup device are frame read-out and field read-out, and in frame read-out, signals 1st, 3rd, 5th,... rows are read out in a first field and signals of 2nd, 4th, 6th, . . . rows are read out in a second field. In related art field read-out, in a first field, two vertically adjacent rows are combined to produce a combination of the 1 st and 2nd rows and a combination of the 3rd and 4th rows, and so on, and the signals of the two combined rows are mixed and output. In a second field two vertically adjacent rows are combined to produce a combination of the 2nd row and the 3rd row and a combination of the 4th row and the 5th row, and so on, with the combinations being different from in the case of the first field.

In contrast with this, in fields of the color CCD solid-state image pickup 5 device of this preferred embodiment, a certain row (K) and a row (K±2) two rows thereabove or therebelow are combined, and signal charges of pixels of the combined two rows belonging to the same vertical columns are mixed and vertically transferred and, naturally, the combinations of the first field and the second field are made different.

Specifically, in the first field, combinations of green G rows such as the 1 st and 3rd rows, the 5th and 7th rows, the 9th and 11th rows, . . . and combinations of red R/blue B rows such as the 2nd and 4th rows, the 6th and 8th rows, the 10th and 12th rows, . . . are made, and signals from pixels of these combined rows belonging to the same vertical columns are mixed. The signals obtained by mixing the green G rows and the signals obtained by mixing the red R/blue B rows are then taken out separately through the two horizontal registers 1a, 1b.

The second field is no different from the first field in that green G rows and red R/blue B rows are combined, mixed and vertically transferred and then a parallel horizontal transfer is carried out by the horizontal registers 1a, 1b, but the combinations are different. That is, in the second field, combinations of green G rows such as the 3rd and 5th rows, the 7th and 9th rows, the 11th and 13th rows . . . are made and combinations of red R/green G rows such as the 4th and 6th rows, the 8th and 10th rows and the 12th and 14th, . . . are made.

As a result, focusing attention on one certain row, the Kth row, there are cases wherein in the first field it is combined, for example, with the K+2th row, and in the second field it is combined with, for example, the K−2th row, and there are also cases wherein in the first field it is combined with the K−2th row and in the second field it is combined with the K+2th row.

For example, focusing attention on the 5th row (K=5), in the first field it is combined with the 7th row (the K+2th row) but in the second field it is combined with the third row (the K−2th row). However, focusing attention on the 7th row (K=7), whereas in the first field it is combined with the 5th row (the K−2th row), in the second field it is combined with the 9th row (the K+2th row). Accordingly, a characteristic feature of the invention is that signal charges of light-receiving parts in pixels of a Kth row (K being a positive integer) and signal charges of light-receiving parts in pixels of either of the K±2th rows are mixed and vertically transferred in the vertical shift registers.

When as shown in FIG. 1 there are two horizontal registers, signal outputting is as shown in FIG. 4 (A), and when there is only one horizontal register, signal outputting is as shown in FIG. 4 (B).

FIGS. 5 (A) through (C) illustrate the operation of this color CCD solid-state image pickup device when the field read-out described above is carried out, (A) and (B) being sectional views on the line A—A' in FIG. 2.

In this color CCD solid-state image pickup device, as in an ordinary color CCD solid-state image pickup device, the pixels receive and photoelectrically convert light entering through the color filters and accumulate signal charges in light-receiving elements. The signal charges accumulated in the light-receiving elements of the pixels are read out by the vertical registers 2, 2, . . . controlled by vertical transfer control pulses V1 to V8 supplied through gate electrodes 3, 3, . . . and vertically transferred by the vertical registers 2, 2, . . .; however, it is different from related art field read-out in that mixing of the signal charges of the Kth row and the K+2th row or the K−2th row is carried out.

Figure 5A:
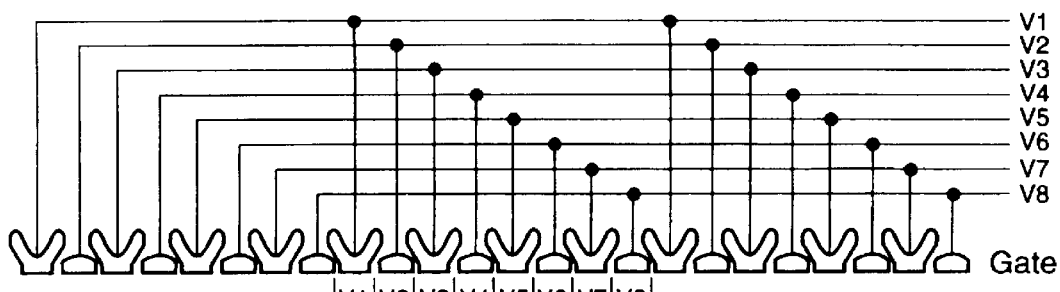
FIGS. 5 (A) through (C) are for illustrate a field operation, FIG. 5(A) showing gate electrodes, FIG. 5(B) showing signal changes in potential of vertical transfer registers and charge transfers and FIG. 5(C) being a waveform view of transfer pulses V1 to V8.
Figure 5B:
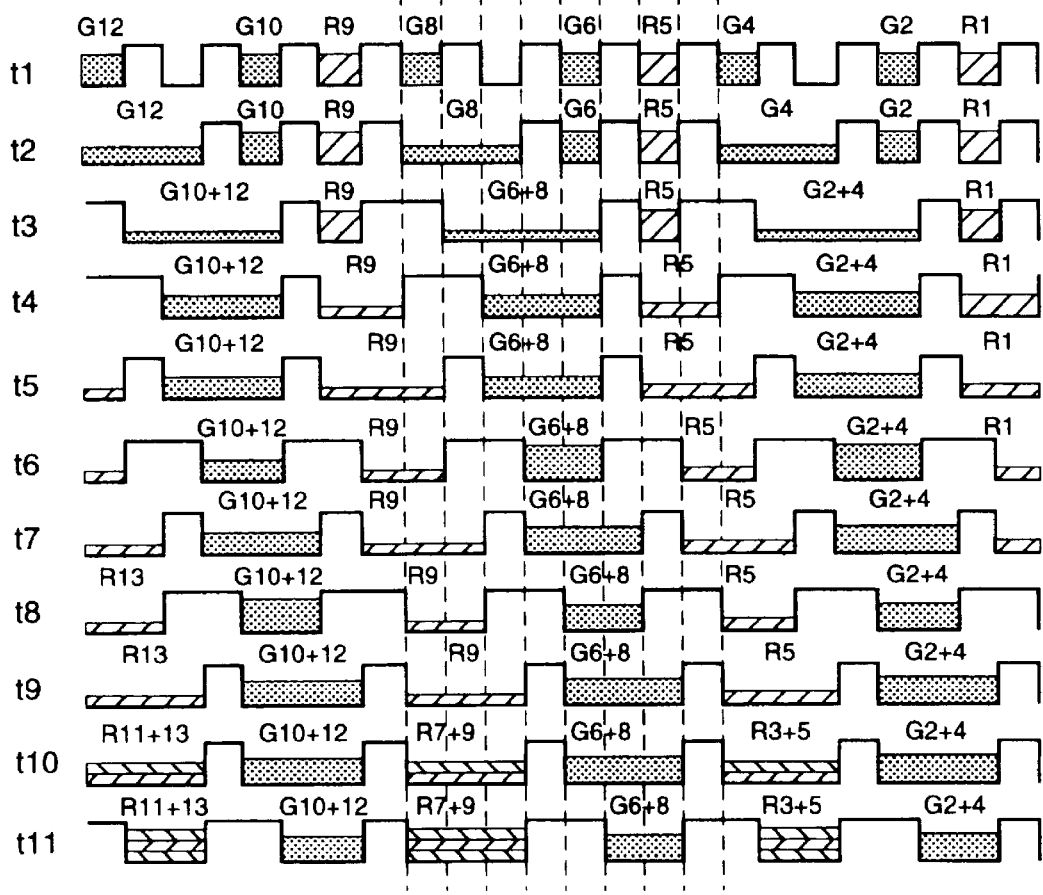
Figure 5C:
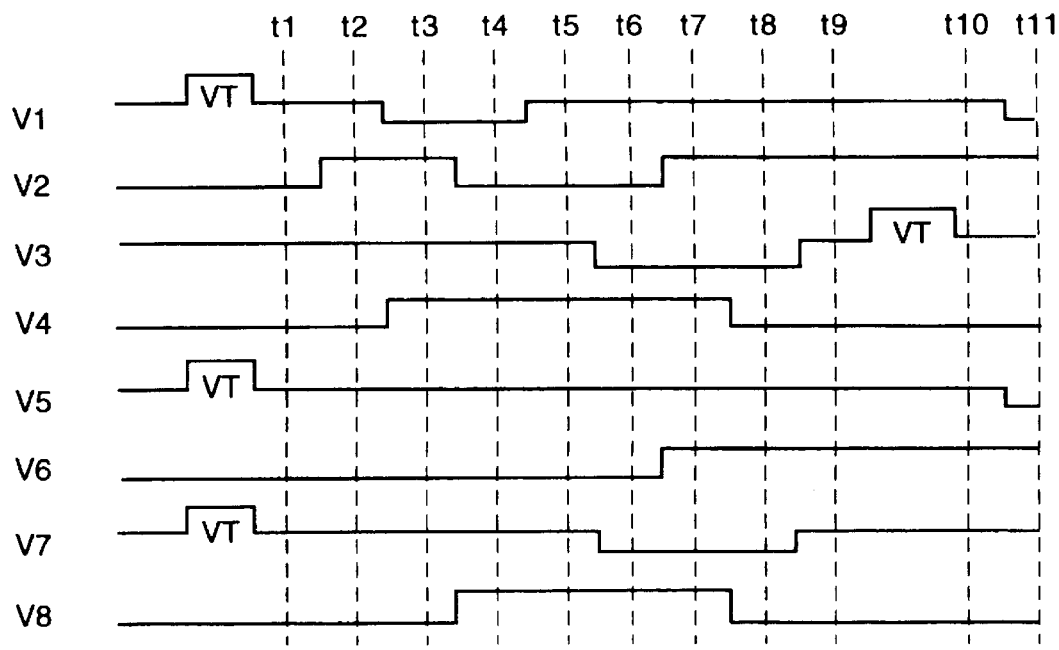

Explaining this specifically with reference to FIGS. 5(A) –5(C), immediately before time t1, pulses V1, V5 and V7 rise to a level VT and signal charges accumulated in the light-receiving elements of the pixels of the rows corresponding to the gate electrodes 3, 3, 3, . . . receiving these pulses are read out into the vertical registers 2, 2, . . . In the row corresponding to the pulse V3, read-out of the signal charges accumulated in the light-receiving elements of the pixels is not carried out and these signal charges remain accumulated.

After that, at time t2, the pulses V1, V2, V3, V5, V7 all rise to a high level. At time t3, the pulses V2, V3, V4 and V5 all rise to a high level and a first signal mixing is carried out. In this example, mixing of the signal charges of green G rows such as G2 and G4, G6 and G8, G10 and G12 is carried out. During this time, mixing of red R/blue B rows is not carried out. Specifically, some (R3, R7, R11, . . . and, although not shown in FIG. 5 (B), B3, B7, B11, . . .) of these remain accumulated in their light-receiving elements and the rest (R1, R5, R9, R13, . . ., and B1, B5, B9, B13, . . .) are isolated inside the vertical registers.

Then, as time passes through t4, t5, t6, t7, t8 and t9, the signal charges (the mixed signal charges and the isolated signal charges) are shifted toward the transfer destination side.

At time t10, the signal charges R1, R5, R9, . . . transferred in isolation reach the above-mentioned rows which had not yet been read out. However, in fact immediately before time t10, the pulse V3 rises to the readout level and read-out is carried out, and therefore at time t10, a second mixing, that is, mixing of signal charges of pixels of mutually combined red R/blue B rows belonging to the same vertical columns, is performed. At time t11 mixing is completely finished.

Thereafter, these mixed signal charges are directly transferred in the vertical direction. As mentioned above, horizontal transfer of the signal charges of the green G rows is carried out by the horizontal register I a and horizontal transfer of the signal charges of the red R/blue B rows is carried out by the horizontal register 1b.

By the operation described above, read-out of the first field is completed, and when this finishes it is necessary to carry out read-out of the second field. This can be carried out by making the pulses V1 to V4 of the same waveform as the pulses V5 to V8 in the first field and making the pulses V5 to V8 of the same waveform as the pulses V1 to V4 in the first field. That is, field read-out can be performed by interchanging the waveforms of the pulses V1 to V4 and the waveforms of the pulses V5 to V8 between each field, it is possible to handle interfacing inside the color CCD solid-state image pickup device and it is not necessary to carry out signal processing for handling interfacing outside the device.

Figure 6:
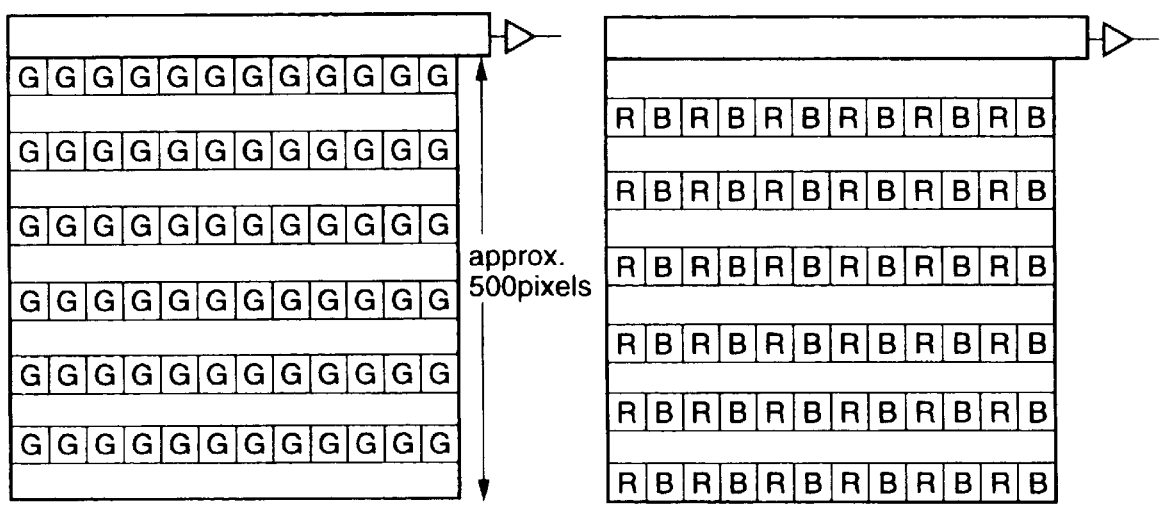
FIG. 6 is a construction view of a double color CCD solid-state image pickup device with which picture quality about the same as with a color CCD solid-state image pickup device according to the invention can be obtained.

With this color CCD solid-state image pickup device it is possible to obtain a picture quality of the same resolution as with a double color CCD solid-state image pickup device using two color CCD solid-state image pickup elements, the number of vertical pixels in each of which is approximately 500, as shown in FIG. 6. In one of the color CCD solid-state image pickup devices all the rows are provided with green G filters and in the other color CCD solid-state image pickup device all the rows have red R and blue B filters disposed alternately.

Figure 7A:
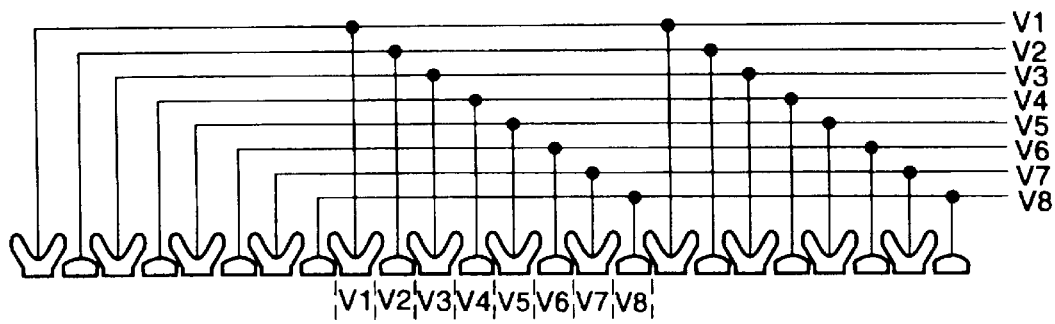
FIGS. 7 (A) and (B) illustrate the operation of another preferred embodiment of the invention, FIG. 7 (A) showing gate electrodes and FIG. 7 (B) showing changes in potential of vertical registers and transfer of signal charges.
Figure 7B:
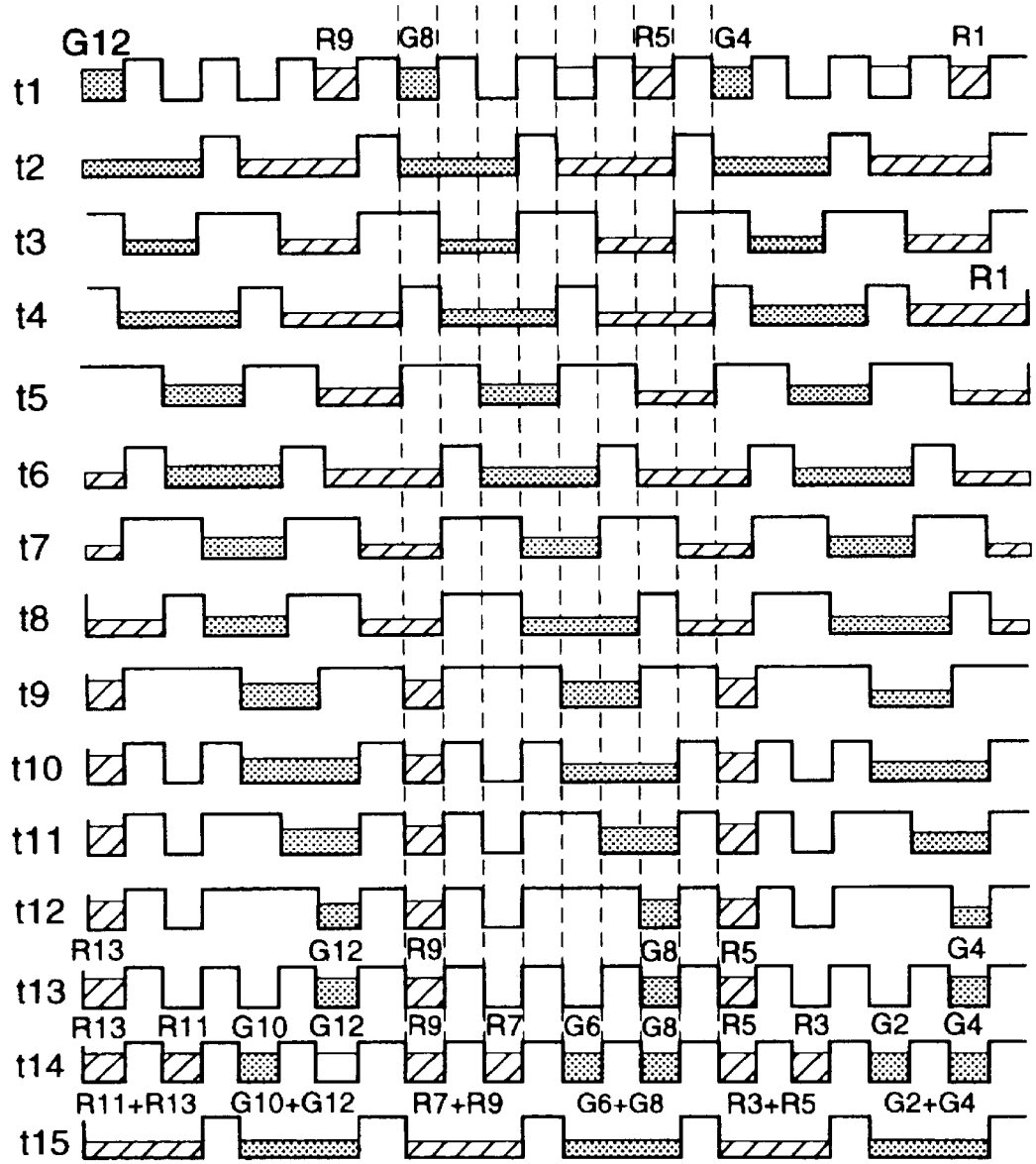
Figure 8:
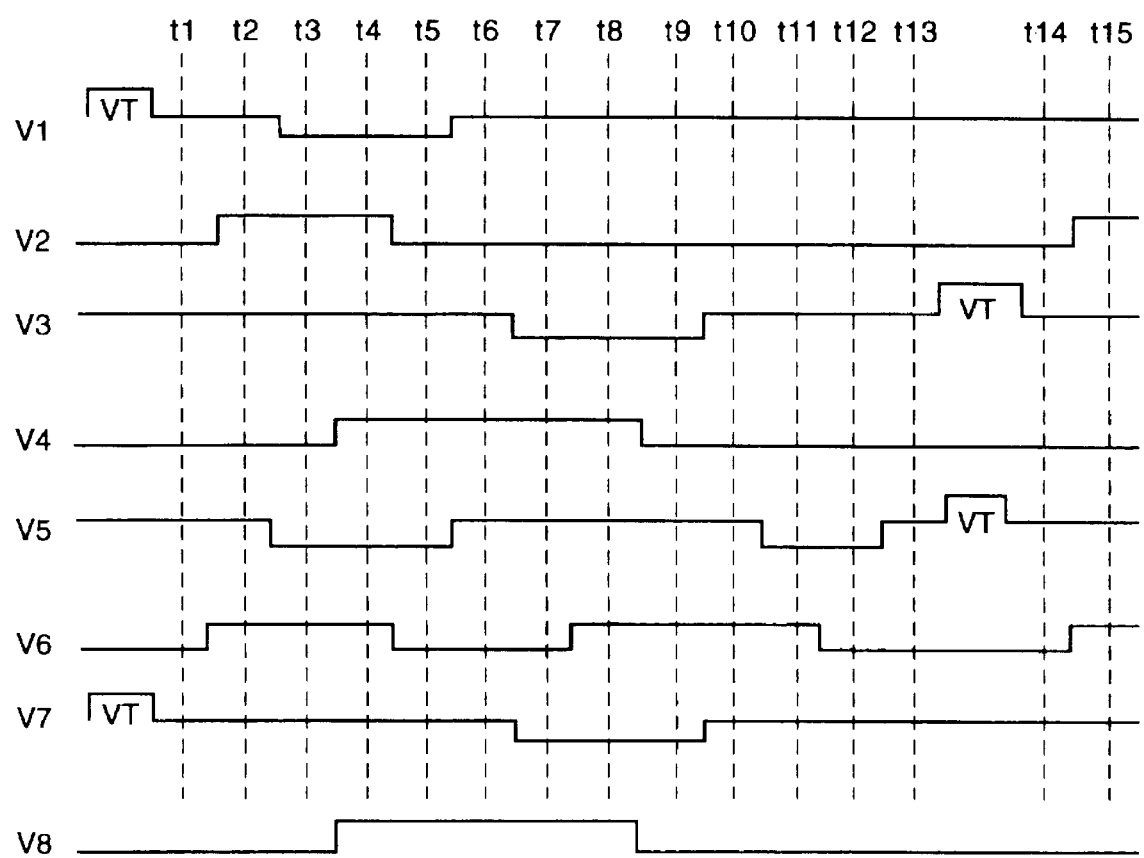
FIG. 8 is a waveform chart of transfer pulses V1 to V8 applied to transfer gate electrodes for illustrating the operation of the other preferred embodiment.

FIGS. 7 (A) and (B) and FIG. 8 illustrate another preferred embodiment of a color CCD solid-state image pickup device according to the invention. FIG. 7 (A) shows a gate construction, FIG. 7 (B) is a view showing changes in potential of vertical transfer registers and transfer of signal charges and FIG. 8 is a timing chart of transfer pulses provided to the gate electrodes.

This preferred embodiment has the same structure and circuit construction as the preferred embodiment shown in FIG. 1 through FIG. 5, and only the way it operates differs. However, needless to say, it has in common with the preferred embodiment described above the point that mixing of signal charges of the Kth row and the K+2th or the K−2th row is carried out.

The operation of this preferred embodiment will now be described.

Immediately before time t1, the pulses V1 and V7 rise to the level VT and signal charges accumulated in light-receiving elements of pixels (for example G8 and R5; hereinafter this operation description will be made taking G8 and R5 and G6 and R3, which are mixed with these, as examples) of rows corresponding to the gate electrodes 3, 3, . . . receiving these pulses are read out into the vertical registers. In the rows corresponding to the pulses V3 and V5, read-out of the signal charges accumulated in the light-receiving elements of the pixels is not carried out and they remain accumulated.

After that, at time t2 the pulses V1, V2, V3, V5, V6, V7 all rise to a high level, at time t3 the pulses V2, V3, V4, V6 and V7 all rise to a high level and transfer of signal charges proceeds as a result of these pulse changes.

At time t12, for example the signal charges G8 and R5 reach the rows corresponding to the pulses V7, V1 (in the case of V1, the row corresponding to V1 in the set of eight rows receiving the next pulses V1 to V8). Immediately after time t13 the pulses V3 and V5 rise to the VT level and at time t14 the signal charges G6 and R3 corresponding to these rows are read out into the vertical registers.

At time t15 mixing of the signal charges G6 and G8 and mixing of R3 and R5 are carried out simultaneously.

After that, these mixed signal charges are directly transferred in the vertical direction.

The above is the operation of the first field; the second field operation can be carried out by making the pulses V1 to V4 of the same waveforms as the pulses V5 to V8 in the first field and making the pulses V5 to V8 of the same waveforms as the pulses V1 to V4 in the first field.

As described above, horizontal transfer of the signal charges of the green G rows is carried out by the horizontal register 1a (see FIG. 1) and horizontal transfer of the signal charges of the red R/blue B rows is carried out by the horizontal register 1b (see FIG. 1).

In the operation shown in FIGS. 5(A)–5(C), first mixing of the signal charges of the green G rows (first mixing) and then mixing of the signal charges of the red R/blue B rows (second mixing) are carried out, but as in this preferred embodiment it is also possible to carry out mixing of signal charges of even rows and mixing of signal charges of odd rows at the same time.

In the preferred embodiments described above, the disposition of the color filters is such that the even rows are green G and the odd rows are red R/blue B; however, the invention is not limited to this and all that is necessary is that in a device having a color filter disposition such that color mixing occurs when signal charges of pixels adjacent in the column direction are mixed the color filter dispositions of the even rows and the odd rows are respectively the same. FIGS. 9 (A) through (C) show examples of other dispositions of color filters which can be used to practice the invention.

With a color CCD solid-state image pickup device according to the invention, even though it has a color filter dispositions such that color mixing occurs when signals of pixels adjacent in the column direction are mixed, because the even rows and odd rows of pixels respectively have the same color filter dispositions, color mixing does not occur when they are mixed and field read-out by mixing and transferring signal charges of pixels of the Kth row and the K+2th row or mixing and transferring signal charges of pixels of the Kth row and the K−2th row becomes possible and it is possible to avoid the problem associated with frame read-out methods that when the signal accumulation time is made one frame period frame afterimaging occurs and when it is made one field period sensitivity is halved.

Of course, when it is not necessary to conform to a television system, by read out pixels without performing the above-mentioned mixing it is possible to reproduce images having superior resolution in the vertical direction.

Although modifications and changes may be suggested by those skilled in the art, it is the intention of the inventors to embody within the patent warranted hereon all changes and modifications as reasonably and properly come within the scope of their contribution to the art.

I claim:

1. A color CCD solid-state image pickup device comprising pixels arrayed in a matrix, vertical shift registers provided in correspondence with vertical columns of pixels for transferring signal charges from said pixels in the vertical direction and a color filter array of a kind such that it is not possible to mix pixels adjacent in the column direction, wherein:

even rows and odd rows of said pixels arrayed in a matrix respectively have the same color filter arrays; and signal charges of light-receiving parts in pixels of a Kth row, K being a positive integer, and signal charges of light-receiving parts in pixels of either of the K±2th rows are mixed and vertically transferred in said vertical shift registers.

2. A color CCD solid-state image pickup device comprising pixels arrayed in a matrix, vertical shift registers provided in correspondence with vertical columns of pixels for transferring signal charges from said pixels in the vertical direction and a color filter array of a kind such that it is not possible to mix pixels adjacent in the column direction, wherein:

even rows and odd rows of said pixels arrayed in a matrix respectively have the same color filter arrays;

signal charges of an even row and signal charges of an even row two rows thereabove or therebelow are mixed in the vertical registers and these two rows are thereby compressed into one; and signal charges of an odd row and signal charges of an odd row two rows thereabove or therebelow are mixed in the vertical registers and these two rows are thereby compressed into one.

3. A color CCD solid-state image pickup device according to claim 2 wherein signal charges of the even rows and signal charges of the odd rows are outputted independently.

4. A color CCD solid-state image pickup device according to claim 3, wherein the signal charges of an even row and the signal charges of an even row two rows thereabove or therebelow are mixed by being transferred in passing through he odd row located therebetween in the vertical shift registers while the signal charges of the odd row are held out of the vertical registers, and then, the signal charges of an odd row and the signal charges of an odd row two rows thereabove or therebelow are mixed.

5. A color CCD solid-state image pickup device according to claim 2, wherein the number of the pixels is about 1,000 in the vertical direction of the device.

6. A color CCD solid-state image pickup device according to claim 2, wherein each row of the pixels has the same color filter arrangement as a row located two rows below or above.

7. A color CCD solid-state image pickup device according to claim 2, wherein said even rows has green filters and said odd row has red and blue filters.

8. A color CCD solid-state image pickup device according to claim 2, wherein the signal charges of said even rows are transferred horizontally by a first horizontal shift register and the signal charges of said odd rows are transferred horizontally by a second horizontal shift register.

9. A color CCD solid-state image pickup device according to claim 2, wherein said signal charges of each pixel are read out of a light-receiving element of each pixel in response to a pulse signal for reading-out.

* * * * *